United States Patent

[11] 3,627,849

| [72] | Inventors | Hans Fernholz<br>Fischbach/Taunus;<br>Heinz Wendt, Sulzbach/Taunus, both of<br>Germany |
|---|---|---|
| [21] | Appl. No. | 812,906 |
| [22] | Filed | Apr. 2, 1969 |
| [45] | Patented | Dec. 14, 1971 |
| [73] | Assignee | Farbwerke Hoechst Aktiengesellschaft<br>vormals Meister Lucius & Bruning<br>Frankfurt/Main, Germany |
| [32] | Priority | Apr. 19, 1968 |
| [33] | | Germany |
| [31] | | P 17 68 242.7 |

[54] PROCESS FOR THE MANUFACTURE OF ALLYL CHLORIDE OR METHALLYL CHLORIDE
8 Claims, No Drawings

| [52] | U.S. Cl. | 260/654 R |
|---|---|---|
| [51] | Int. Cl. | C07c 21/00 |
| [50] | Field of Search | 260/654 |

[56] References Cited
FOREIGN PATENTS
268,340  12/1912  Germany...................... 260/654

OTHER REFERENCES
Beilstein, 3rd supplement, Springer–Verlag, Berlin (1959) p. 699

*Primary Examiner*—Howard T. Mars
*Attorney*—Curtis, Morris & Safford

ABSTRACT: A process for the manufacture of allyl chloride or methallyl chloride, which comprises reacting allyl acetate or methallyl acetate with dry gaseous hydrogen chloride in the presence of 0.01 to 10 percent by weight of a catalyst comprising a mixture of a salt of monovalent or bivalent copper selected from the group consisting of $CuCl$, $CuCl_2$, $CuBr$, $CuBr_2$, $CuOOC.CH_3$, $Cu(OOC.CH_3)_2$, $Cu_2SO_4$, $CuSO_4$ and mixtures thereof, with a halogen containing Lewis acid selected from the group consisting of $FeCl_3$, $AlCl_3$, $AlBr_3$, $ZnCl_2$, $TiCl_4$, $BeCl_2$, $ZrCl_4$, $SbCl_5$ and $BiCl_3$ at temperatures within the range of from 20° to 200° C. wherein the copper salt in the mixture is present in proportionate amounts equal to or less than the Lewis acid component.

PROCESS FOR THE MANUFACTURE OF ALLYL CHLORIDE OR METHALLYL CHLORIDE

The present invention relates to a process for the manufacture of allyl chloride or methallyl chloride.

Various processes have been proposed for the manufacture of allyl chloride. Allyl chloride is generally obtained on an industrial scale by high-temperature chlorination of propylene. This process has the disadvantage that only half the amount of chlorine used as starting material can be utilized for the manufacture of allyl chloride; the other half is reacted to hydrogen chloride and is lost from the manufacture of allyl chloride unless the hydrogen chloride is oxidized to chlorine in a further reaction stage.

For a better utilization of the chlorine it has been proposed to produce allyl chloride directly by oxychlorination of propylene with hydrogen chloride and oxygen. Two processes have been proposed for this purpose. One is carried out at elevated temperatures, using lithium or magnesium chloride as catalysts, while the other is performed at somewhat lower temperatures in the presence of tellurium or tellurium compounds. In both processes water is formed which reacts with the hydrogen chloride to form hydrochloric acid so that part of the hydrogen chloride is lost. Because of the corrosive properties of hydrochloric acid, particular additional technical measures are required.

It has also been proposed to make allyl chloride by reacting allyl alcohol or its formic acid ester with hydrochloric acid or hydrogen chloride in the presence of relatively large amounts of zinc chloride. However, allyl alcohol and allyl formate cannot be used for an industrial process because they are technically much more difficulty obtainable than allyl chloride. Moreover, the reaction proceeds relatively slowly and yields only relatively small amounts of allyl chloride.

The present invention provides a process for the manufacture of allyl chloride and methallyl chloride, respectively, which comprises reacting allyl acetate or methallyl acetate with hydrogen chloride in the presence of 0.01 to 10 percent by weight of a catalyst comprising a mixture of copper salts and Lewis acids, at temperatures within the range of from 20° to 200° C., preferably above 45° C.

The acetic acid formed at the same time is recovered substantially quantitatively. The allyl acetate to be used in the process of the invention is obtained by a known process from propylene, oxygen and acetic acid in the presence of palladium catalysts in the gaseous phase in a technically simple manner. The allyl acetate and methallyl acetate are substantially quantitatively converted into allyl chloride and methallyl chloride.

The catalyst mixture is advantageously used in an amount within the range of from 0.01 to 10 percent by weight, calculated on the allyl acetate or methallyl acetate used as starting material. Preferably, 0.1 to 5 percent by weight of the catalyst mixture is used. The mixing ratio between copper salt and Lewis acid may be varied at will within the above limits. When carrying out the process of the invention in practice catalyst mixtures consisting of equal proportions of both components or containing the copper salt in a deficiency have proved particularly advantageous.

As Lewis acids the following compounds may, for example, be used: iron (III) chloride, aluminum chloride, aluminum bromide, zinc chloride, titanium (IV) chloride, beryllium chloride, zirconium (IV) chloride, antimony (V) chloride and bismuth (III) chloride. Of these compounds iron (III) chloride, aluminum chloride and zinc chloride are particularly suitable. All these compounds are advantageously used in an anhydrous form.

As copper salts there are used in accordance with the invention salts of monovalent or bivalent copper or mixtures of salts of monovalent copper with salts of bivalent copper. Examples of suitable copper salts are the chlorides, bromides, sulfates and acetates. Generally, copper chlorides are used for the process of the invention. It is advantageous to use the anhydrous salts of copper.

It is surprising that the catalytic action of the catalyst mixtures to be used in accordance with the invention is not additively composed of the activities of the individual catalyst components. The copper salts alone, for example, have only a slight catalytic action. Although the Lewis acids are much more catalytically effective, they cannot be used alone for a large-scale process because considerable amounts of catalyst would be needed. Moreover, the Lewis acids, when used alone, would give rise to side reactions, for example the formation of diallyl ether, and would thereby considerably reduce the yields of allyl chloride or methallyl chloride. Contrary thereto, the catalyst mixtures used in accordance with the invention are distinguished by an excellent activity and selectivity which ensure substantially quantitative conversions.

The reaction temperature is kept within the range of from 20° to 200° C. It is advantageous to use temperatures above 45° C. if it is intended to immediately separate the allyl chloride formed from the reaction mixture.

The reaction is advantageously carried out in the liquid phase or in a so-called countercurrent process. Many of the catalyst components, particularly the Lewis acids, are soluble in allyl acetate. The copper salts are less readily soluble in allyl acetate so that they are partially present in a suspended form. The proportion of copper salts dissolved in the allyl acetate is sufficient, however, to obtain a complete catalytic action.

The process of the invention may also be carried out in an inert solvent, for example a chlorinated hydrocarbon such as, for example, hexachloroethane, pentachloroethane or tetrachloroethane. In this case it is advantageous to choose a solvent the boiling point of which is above that of the acetic acid. It is further more possible to carry out the process of the invention in the gaseous phase. In that case, the gaseous reaction components are passed over the catalyst mixture which is arranged in a fixed manner and may be supported on an appropriate carrier.

The hydrogen chloride which has advantageously been dried is used in the gaseous state. It may either be introduced into the solution or suspension of the catalyst in allyl acetate or it may be conducted in countercurrent to the solution or suspension of the catalyst mixture and the allyl acetate, which solution is trickling down. Any proportions of hydrogen chloride that have not been reacted are returned and used again so that the hydrogen chloride is substantially utilized.

The process in accordance with the invention is advantageously carried out under atmospheric pressure, but may also be performed under elevated or reduced pressure.

The allyl chloride formed is advantageously removed from the reaction mixture immediately, which ensures a complete conversion. An addition of hydrogen chloride to allyl chloride could not be observed under the reaction conditions of the invention. The allyl chloride is separated by known methods, for example, by fractional distillation or by condensation.

Of the different modes of executing the process of the invention, the following method has proved advantageous for the discontinuous manufacture of allyl chloride.

Dry gaseous hydrogen chloride is introduced into a flask containing gently boiling allyl acetate (boiling point about 103.5° C.) in which the catalyst components have been dissolved or suspended.

The allyl chloride which is being formed (boiling point about 45° C.) is distilled off immediately if the temperature of the reflux condenser disposed on the flask is maintained above the condensation temperature of the allyl chloride and below the boiling point of the allyl acetate, for example at 50° C. As the reaction proceeds, acetic acid (boiling point about 118.5° C.) which may be reused for the manufacture of allyl acetate accumulates in the sump.

As already mentioned above, the process of the invention may also be carried out continuously. For this purpose, the allyl acetate with the dissolved or suspended catalyst mixture trickles in countercurrent to a hydrogen chloride stream. The allyl chloride formed can be distilled off in a simple manner.

The acetic acid is removed in a low zone of the distillation while the catalyst can be removed from the sump with the residual acetic acid.

The allyl compounds which have been used as starting material or have been formed do not tend to polymerize under the reaction conditions of the invention. In an analogous manner, methallyl chloride (boiling point about 72° C.) can be obtained from methallyl acetate (boiling point about 124° C.)

The process of the invention has the advantage that allyl chloride and methallyl chloride, respectively, can be obtained in substantially quantitative yields from technically easily accessible allyl acetate and methallyl acetate, respectively, by reaction with hydrogen chloride. In the process of the invention, no losses of chlorine arise and no corrosion problems due to aqueous hydrochloric acid are encountered as is the case in the known processes.

The following examples serve to illustrate the invention, but are not intended to limit it.

EXAMPLE 1 one hundred grams allyl acetate (1.0 mole) were heated to 80° C. together with a mixture of 1 gram iron (III) chloride and 0.5 gram copper chloride. Into the hot mixture 0.4 mole of gaseous hydrogen chloride was introduced per hour. After a few minutes, allyl chloride was distilled off, corresponding to the introduction of hydrogen chloride, via a reflux condenser heated at about 50° C., and was condensed in a Liebig condenser. After about 2.5 hours the yield of allyl chloride amounted to 75.4 grams (0.985 mole), which corresponded to 98.5 percent of the theoretical.

EXAMPLE 2

One hundred grams allyl acetate (1.0 mole) were boiled under reflux with 0.5 gram anhydrous aluminum chloride and 0.5 gram copper acetate, while introducing 0.4 mole hydrogen chloride per hour. After a short time, allyl chloride was distilled off via a reflux condenser heated at about 50° C. After a reaction time of about 2.5 hours the yield of allyl chloride was 75 grams (0.98 mole), which corresponded to 98.0 percent of the theoretical.

EXAMPLE 3

One hundred grams allyl acetate (1.0 mole) were heated to 80° C. together with a mixture of 1 gram anhydrous zinc chloride and 1 gram copper chloride. Into the hot mixture 0.4 mole gaseous hydrogen chloride was introduced per hour. After a few minutes allyl chloride was distilled off, corresponding to the introduction of hydrogen chloride, via a reflux condenser heated at about 50° C. and was condensed in a Liebig condenser. The yield of allyl chloride was 75.4 grams (0.985 mole), which corresponded to 98.5 percent of the theoretical.

EXAMPLE 4

One hundred grams allyl acetate (1.0 mole) were heated to 90° C. together with 0.05 gram anhydrous zinc chloride and 0.05 gram copper chloride. Into the hot solution 0.1 mole gaseous hydrogen chloride was introduced per hour. After a few minutes allyl chloride was distilled off, corresponding to the introduction of hydrogen chloride, via a reflux condenser heated at about 50° C. and was condensed in a Liebig condenser. The yield of allyl chloride was 75.1 gram (0.982 mole), which corresponded to 98.2 percent of the theoretical.

EXAMPLE 5

One hundred grams allyl acetate (1.0 mole) were boiled under reflux together with a mixture of 4.5 grams anhydrous iron (III) chloride and 0.5 gram copper chloride, while introducing 0.4 mole hydrogen chloride per hour. After a short time allyl chloride was distilled off via a reflux condenser heated at about 50° C. The yield of allyl chloride was 75.0 grams (0.98 mole), which corresponded to 98.0 percent of the theoretical.

EXAMPLE 6

One hundred grams allyl acetate (1.0 mole) were heated to 80° C. together with a mixture of 8.5 grams anhydrous zinc chloride and 1.5 grams copper chloride. Into the hot mixture 0.4 mole gaseous hydrogen chloride was introduced per hour. After a few minutes allyl chloride was distilled off, corresponding to the introduction of hydrogen chloride, via a reflux condenser heated at about 50° C. and was then condensed in a Liebig condenser. The yield of allyl chloride amounted to 75 grams (0.98 mole), which corresponded to 98.0 percent of the theoretical.

COMPARISON EXAMPLE

When 100 grams allyl acetate (1.0 mole) were reacted with 0.4 mole per hour of gaseous hydrogen chloride as described in example 1, but while using, instead of the mixture of 1.0 gram iron (III) chloride and 0.5 gram copper chloride, only 1.0 gram iron (III) chloride as catalyst, a considerably smaller amount of allyl chloride, calculated on the amount of hydrogen chloride introduced, was distilled off than in example 1. After a reaction time of about 2.5 hours the yield of allyl chloride was only 24.0 grams, which corresponded to 31.4 percent of the theoretical. When the test was continued the yield increased to about 50 percent of the theoretical after 5 hours. The speed of reaction was, however, reduced to an ever increasing extent so that the yield was not substantially increased by continuing the test for more than 5 hours. At the same time, considerable amounts of by-products were formed.

When the test was carried out under the same conditions, but while using as catalyst, instead of 1.0 gram iron (III) chloride, 1.0 gram zinc chloride, the yield of allyl chloride was 28.0 grams after a reaction time of about 2.5 hours, which corresponded to about 36.6 percent of the theoretical.

What is claimed is:

1. A process for the manufacture of allyl chloride or methallyl chloride, which comprises reacting allyl acetate or methallyl acetate with dry gaseous hydrogen chloride in the presence of 0.01 to 10 percent by weight of a catalyst comprising a mixture of a salt of monovalent or bivalent copper selected from the group consisting of CuCl, $CuCl_2$, CuBr, $CuBr_2$, $CuOOC \cdot CH_3$, $Cu(OOC \cdot CH_3)_2$, $Cu_2SO_4$, $CuSO_4$ and mixtures thereof, with a halogen containing Lewis acid selected from the group consisting of $FeCl_3$, $AlCl_3$, $AlBr_3$, $ZnCl_2$, $TiCl_4$, $BeCl_2$, $ZrCl_4$, $SbCl_5$ and $BiCl_3 ==$ at temperatures within the range of from 20° to 200° C. wherein the copper salt in the mixture is present in proportionate amounts equal to or less than the Lewis acid component.

2. The process of claim 1 wherein the reaction of allyl acetate or methallyl acetate is carried out in the presence of 0.1 to 5 percent by weight of said catalyst mixture.

3. The process of claim 1 wherein the reaction with hydrogen chloride is carried out at a temperature above 45° C.

4. The process of claim 1 wherein the Lewis acid is iron (III) chloride.

5. The process of claim 1 wherein the Lewis acid is aluminum chloride.

6. The process of claim 1 wherein the Lewis acid is zinc chloride.

7. The process of claim 1 wherein anhydrous copper salts are used as copper salts.

8. The process of claim 1 wherein the reaction is carried out in liquid phase.

* * * * *